(No Model.)

S. PARKER.
CONDUIT FOR ELECTRIC WIRES.

No. 279,977. Patented June 26, 1883.

ATTEST:
Geo. F. Dexter
A. Campbell.

INVENTOR:
Sidney Parker
per Robert Burns
Attorney.

UNITED STATES PATENT OFFICE.

SIDNEY PARKER, OF CHICAGO, ILLINOIS, ASSIGNOR OF ONE-HALF TO EDWARD D. COXE, OF SAME PLACE.

CONDUIT FOR ELECTRIC WIRES.

SPECIFICATION forming part of Letters Patent No. 279,977, dated June 26, 1883.

Application filed April 14, 1883. (No model.)

*To all whom it may concern:*

Be it known that I, SIDNEY PARKER, a citizen of the United States, and a resident of Chicago, in the county of Cook and State of Illinois, have invented certain new and useful Improvements in Conduits for Electric Wires, of which the following is a specification.

My invention relates to certain improvements in that class of conduits used for carrying a number of wires for the transmission of electricity; and the objects of my improvement are, first, to furnish an improved means for joining the conduit-sections together; second, to provide means to permit of the ready expansion and contraction of such conduit. I attain these objects by the construction and arrangement of parts illustrated in the accompanying drawings, in which—

Figure 1:
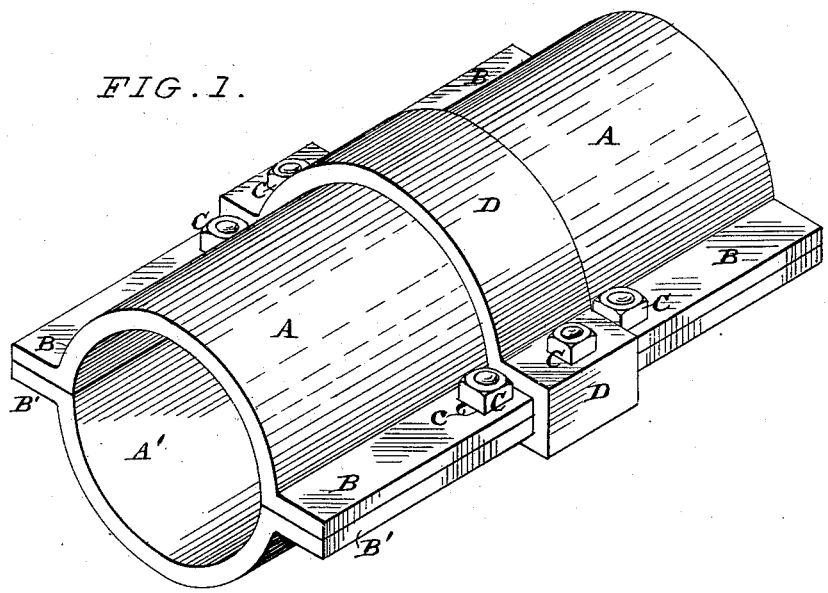
Figure 2:
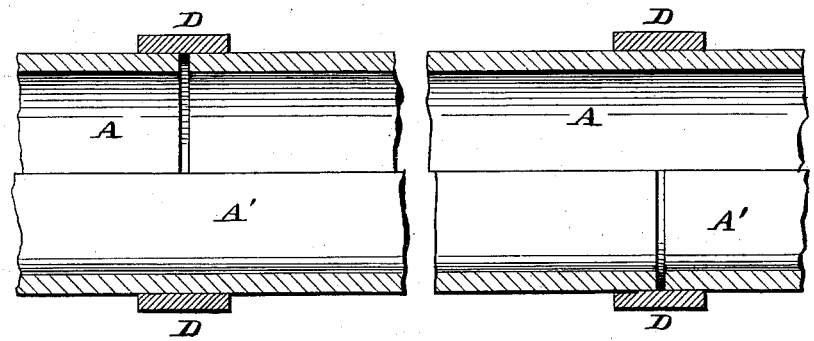

Figure 1 is a perspective view, and Fig. 2 a longitudinal section.

As shown in the drawings, my improved conduit is formed of two semicircular sections, A A', having flanges B B', through which bolts C pass to secure the sections together. These sections are made preferably of iron, yet any other suitable material may be used without departing from the spirit of my invention. The sections are secured together so as to break joints with each other, as indicated in Fig. 2, and in order to permit of a movement of one section upon the other I form the bolt-holes $c$ of an elongated shape, this movement being caused by the expansion of the sections. The joints are left a proper distance apart, so as to permit of the movement above mentioned, and such space is covered by a sleeve, D, as clearly indicated in Fig. 2.

While I have shown the conduit as having a circular shape, yet the form may be changed as found most convenient or desirable without departing from the spirit of my invention. Also, the sleeves D, instead of entirely encircling the conduit, may be made in the shape of a semicircle with projecting flanges, by means of which it is bolted in place.

Having thus fully described my invention, what I claim, and desire to secure by Letters Patent, is—

In a conduit for electric wires, the sections A A', arranged so as to break joint with each other, and having flanges B B', through which are elongated bolt-holes $c$, in combination with bolts C and joint-inclosing sleeve D, as described, and for the purpose set forth.

SIDNEY PARKER.

Witnesses:
ROBERT BURNS,
JNO. H. BURNETT.